O. H. H. HEINS.
TIMING DEVICE FOR MAGNETOS.
APPLICATION FILED FEB. 18, 1908.
1,056,098.
Patented Mar. 18, 1913.
2 SHEETS—SHEET 1.
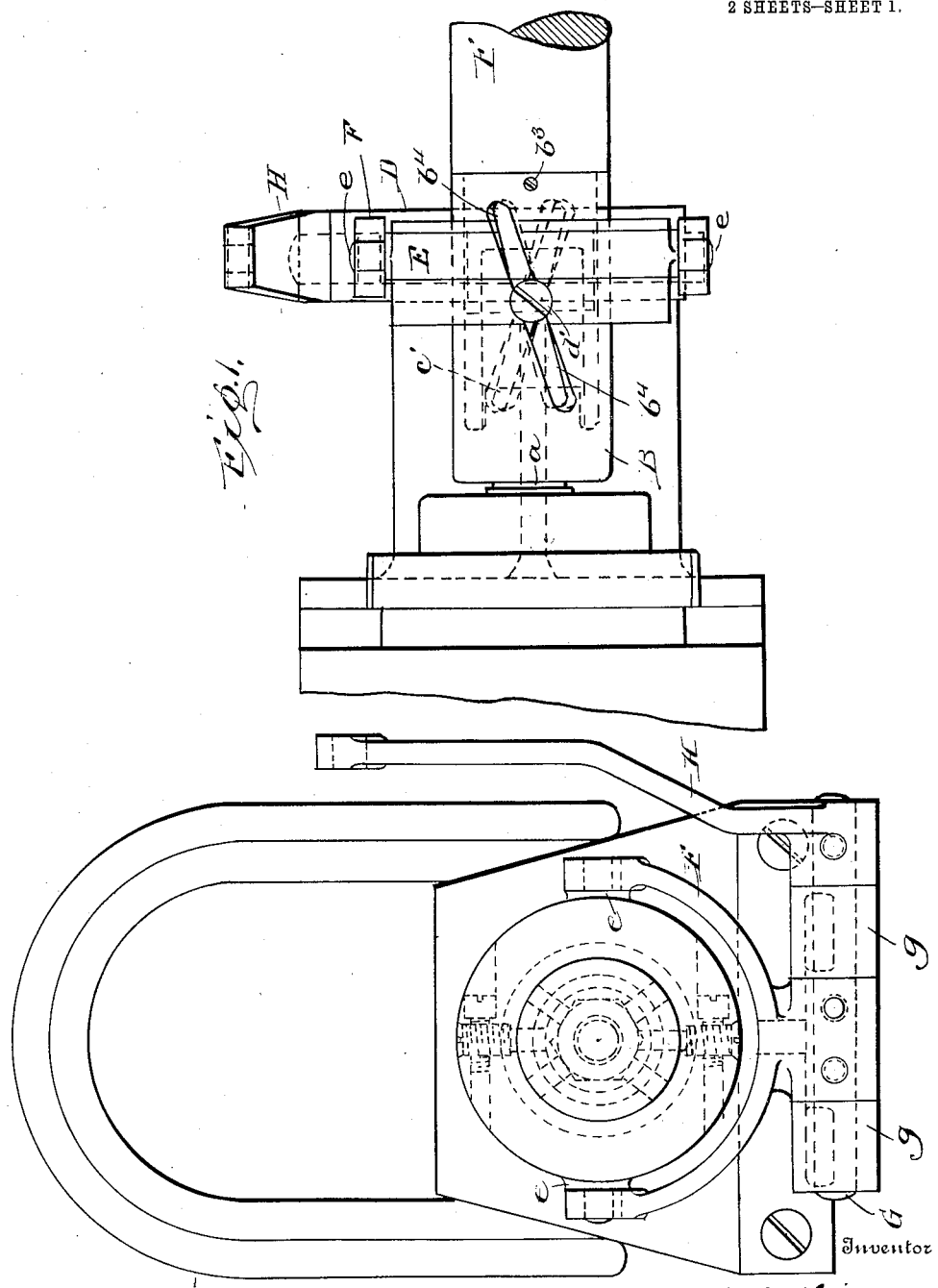

O. H. H. HEINS.
TIMING DEVICE FOR MAGNETOS.
APPLICATION FILED FEB. 18, 1908.
1,056,098.
Patented Mar. 18, 1913.
2 SHEETS—SHEET 2.
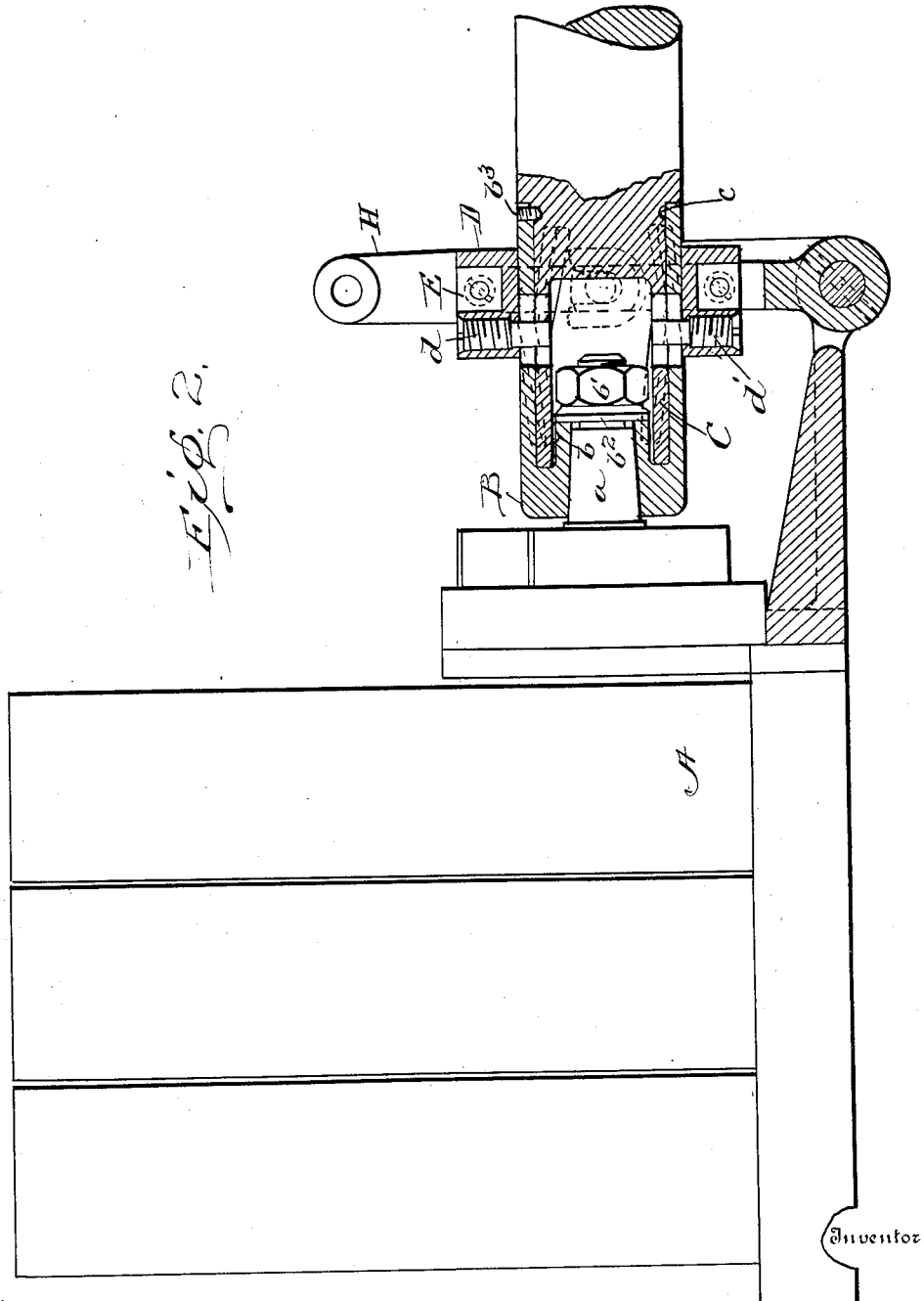

UNITED STATES PATENT OFFICE.

OTTO HEINRICH HUGO HEINS, OF EDGEWATER, NEW JERSEY.

TIMING DEVICE FOR MAGNETOS.

1,056,098. Specification of Letters Patent. Patented Mar. 18, 1913.

Application filed February 18, 1908. Serial No. 416,569.

*To all whom it may concern:*

Be it known that I, OTTO H. H. HEINS, citizen of the German Empire, residing at Valley Place, Edgewater, New Jersey, have invented certain new and useful Improvements in Timing Devices for Magnetos; and I do hereby declare the following to be a full, clear, and exact description of the invention, such as will enable others skilled in the art to which it appertains to make and use the same.

My invention relates to an improvement in timing devices for magnetos.

The object of my invention is to provide means whereby the driving shaft and the armature of a generator may be adjusted relatively to each other in order to advance or retard the time of ignition and which will effect such adjustment whether the parts be in operation or at rest.

With this general object in view, my invention consists in the features, details of construction, and combination of parts which will first be described in connection with the accompanying drawings and then particularly pointed out in the claims.

In the drawings Figure 1 is a plan view of a magneto generator and its driving shaft embodying my invention; Fig. 2 a side elevation partly in section of the same; and Fig. 3 an end view with the driving shaft removed.

Referring to the drawings, A is an electric generator, in this case a magneto-electric generator, whose armature shaft has a projecting end as indicated at $a$. To this end $a$ is secured an outer sleeve B in any suitable way but most advantageously as follows: The end $a$ is tapered as shown in Fig. 2 and beyond the tapered portion is provided with a screw-threaded portion. The outer sleeve B has an inward projecting boss $b$ which is internally tapered to fit tightly onto the tapered portion $a$ of the armature shaft, and is clamped tightly in place by a nut $b'$ screwed onto the threaded portion of the armature shaft, a washer $b^2$ being inserted between the nut $b'$ and the boss $b$. Within the outer sleeve is located an inner sleeve C which is arranged to have an angular or limited rotary movement, relative to the outer sleeve B, but is held against axial movement by any suitable means, as, for example, by providing the inner sleeve with a peripheral groove, indicated at $c$ into which projects the end of a screw $b^3$ carried by the outer sleeve B.

The outer and inner sleeves, B and C, are provided with slots inclined to the axes of the sleeves, the slot in the inner sleeve sloping in a direction opposite to that of the slot in the outer sleeve. In Fig. 1 the slot in the outer sleeve is indicated in full lines at $b^4$, while the slot in the inner sleeve is indicated at $c'$ by dotted lines. It is advantageous to have a plurality of sets of these slots, for example, two, diametrically opposite each other, as is clear from Fig. 2. I find in practice that for the purposes of adjusting an igniter generator the inclination of the slots relative to the longitudinal axis of the sleeves should be about 18 degrees 45 minutes, or in other words, about one fourth the maximum angular adjustment which it may be desired to give to the armature shaft.

The outer sleeve is surrounded by a collar D arranged for movement axially of the coupling, this collar having as many studs as there are sets of slots in the sleeves. In the present instance I have shown two of such studs, as indicated at $d, d'$ each threaded into the collar and having an end which projects through the corresponding slot in the outer sleeve and engages the corresponding slot in the inner sleeve. The collar D is arranged to be shifted axially of the sleeves by suitable means, as for example, by providing the collar with a circumferential groove in which is mounted a ring E having trunnions $e$ journaled in a fork F secured on a shaft G, journaled in bearings $g$, to which shaft is fixed an arm H arranged to be adjusted as desired in any suitable way.

The inner sleeve is connected to the means for driving the generator in the present case being shown as integral with the end of the driving shaft.

The operation of the device is as follows: Assuming that the studs $d, d'$ are at the centers of the slots, it will be seen that by moving the collar toward the generator, the outer sleeve and the armature connected thereto would be rotated in one direction, the amount of such rotation depending upon the extent of the movement of the collar. If the collar is moved to the full extent of its movement toward the generator, the outer sleeve and armature will be rotated 37° 30′ in said direction. If the collar be moved from the central position away from the generator, the outer sleeve and armature will be rotated in an opposite direction, the limit of this movement being 37° 30′ from the intermediate position. Hence by the described arrangement the armature may be adjusted relative to the driving shaft a total of 75 degrees, although the slots are each inclined only 18° 45′ to the axis of the coupling. The shifting of the collar is done conveniently by moving the lever H in the desired direction. It is to be noted that the device may be operated to adjust the armature either when the shaft is still or when it is in rotation.

This invention is designed particularly for advancing or retarding the time of ignition in ignition systems for explosive engines, and permits such an accuracy and nicety of adjustment that the starting of the engine and the continued operation of the same is made easy and certain.

Having thus fully described my invention, what I claim as new is:—

1. In a timing device for magnetos, the combination with the exteriorly coned end of an armature shaft, a sleeve having an interiorly coned end to fit over the coned end of the said shaft, a boss formed on the sleeve end and overlapping the shaft end, a nut threaded on the shaft end and bearing on the boss, a driving shaft, a sleeve formed on the end of the driving shaft and arranged to have a sliding fit within the first sleeve with its end within the annular space between the overlapping boss and the inner face of the first sleeve, the two sleeves provided with intersecting slots in both sleeves, a collar mounted on the outer sleeve and provided with means engaging in the intersecting slots in both sleeves, and means to shift the collar longitudinally of the shaft and sleeves.

2. In a timing device for magnetos, the combination with the exteriorly coned end of an armature shaft, a sleeve having an interiorly coned end to fit over the coned end of the said shaft, a boss formed on the sleeve end and overlapping the shaft end, a nut threaded on the shaft end and bearing on the boss, a driving shaft, a sleeve formed on the end of the driving shaft and arranged to have a sliding fit within the first sleeve with its end within the annular space between the overlapping boss and the inner face of the first sleeve, an annular groove formed on the outer face of the second sleeve, a pin carried by the first sleeve and engaging in the groove to prevent relative longitudinal movement of the two sleeves, the two sleeves provided on opposite sides with a pair of intersecting slots oppositely inclined to the sleeve axis, a collar mounted on the outer sleeve and carrying studs engaging the slots in both sleeves, and means to shift the collar longitudinally of the sleeves.

In testimony whereof I hereunto affix my signature in the presence of two witnesses.

OTTO HEINRICH HUGO HEINS.

Witnesses:
GUNTHER JAHRY,
E. A. HUNT.